Aug. 23, 1960  E. FEINDLER  2,949,817
DRIVING MECHANISM FOR MICROTOME
Filed April 22, 1958
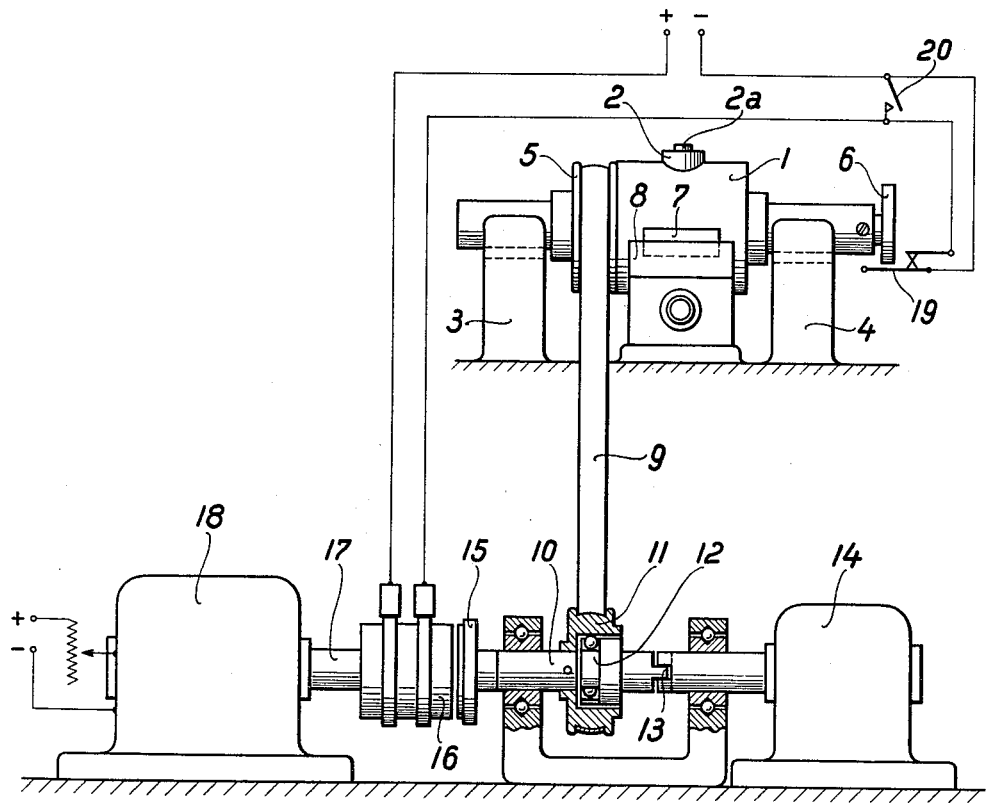
Ernst Feindler
INVENTOR.
BY

United States Patent Office 2,949,817
Patented Aug. 23, 1960

2,949,817

DRIVING MECHANISM FOR MICROTOME

Ernst Feindler, Wetzlar, Germany, assignor to Ernst Leitz, G.m.b.H., Wetzlar, Germany, a corporation of Germany Filed Apr. 22, 1958, Ser. No. 730,224

Claims priority, application Germany May 25, 1957

2 Claims. (Cl. 88—40)

This invention relates to improvements in driving mechanisms for microtomes and the object of the invention is to provide a novel and improved driving mechanism for microtomes whereby certain disadvantages in prior arrangements are avoided or eliminated and the operation of the microtome generally improved. The invention is embodied in a driving mechanism for regulating the movements of the object and this driving mechanism consists of two driving devices. A high speed driving device regulates the microtome operation while the object is being transported towards and away from the cutter. A low speed driving device regulates the movement of the object while it is being cut. The microtome itself regulates the operations of the driving devices. Heretofore there have been some difficulties in the regulation of the speed of the movement of the object in relation to the cutting speed. This invention avoids such difficulties.

Preferably the high speed driving device for moving the object during the interval between two consecutive cutting operations is actuated by a magnetic clutch operable from the microtome, whereas the slow speed driving device is actuated by a mechanical clutch when the circuit to the magnetic clutch is cut off.

If metals are to be cut one may use a greater cutting speed and it is therefore desirable to provide a switch for permanently closing the circuit to the magnetic clutch, and this device may also be used as a continuous high speed drive for longer periods of operation.

In the accompanying drawing the microtome 1 is in the form of a rotor rotatably supported in two bearings 3 and 4. The object carrier 2 is radially supported in the rotor 1. The latter carries at one end a belt pulley 5 and at the other end an eccentric disk 6. The microtome knife 7 is supported in a receiving trough 8 for receiving the cuttings. The trough may in known manner be adjustable by micrometer screws, not shown.

The driving mechanism for driving the microtome has a driving shaft 10 with a belt pulley 11 connected to the pulley 5 by a driving belt 9. The driving shaft 10 is connected to the slow speed motor 14 by means of a ball clutch 12 and a claw clutch 13.

The other end of the driving shaft 10 carries a coupling disk 15 which is part of a magnetic clutch 16. The latter is carried by the driving shaft 17 of a high speed motor 18. The eccentric disk 6 in the microtome periodically opens a switch 19 which is connected in the circuit to the magnetic clutch 16 to periodically energize the latter. Another switch 20 may be provided for permanently closing the circuit to the magnetic clutch.

When the high speed motor circuit is first closed the high speed motor 18 drives the microtome by way of the high speed motor driving shaft 17, the magnetic clutch 16—15, driving shaft 10, belt pulley 11, belt 9 and the belt pulley 5. The slow speed motor 14 runs idle.

When the object 2a in the object carrier 2 approaches the knife 7, the eccentric disk 6 engages the switch 19 to open the magnetic clutch circuit. The motor 18 is then disconnected from the driving shaft 10 and the microtome 1 stops rotating because of friction, as will be understood, until the slow speed motor 14 becomes the driving power by way of the couplings or clutches 12 and 13. The driving power of the slow speed motor 14 is so measured or designed that the object is not damaged by the cutting operation. After completion of the cutting operation, the switch 19 is again closed. The magnetic clutch is then again energized to connect the high speed motor 18 to the driving shaft 10 to drive the microtome and the motor 14 then again runs idle. When the switch 20 is closed the magnetic clutch circuit remains closed and the motor 18 then continues to drive the microtome. The claw clutch 13 is designed with an inherent loose grip so that the quick stopping of the rotor 1 does not cause disturbing shakings or like undesirable effects.

I claim:

1. In a microtome for cutting an object, a cutter for cutting the object, a driving shaft, a high speed motor, a magnetic clutch for connecting said driving shaft with said high speed motor to drive the microtome to transport the object to the said cutter, a low speed motor, mechanical clutching means for connecting said driving shaft with the said low speed motor during the cutting operations of the said microtome, a belt drive connecting the driving shaft with the microtome to drive the latter, an eccentric disc rotatably connected with said microtome, an electric circuit normally energizing said magnetic clutch, a switch in said circuit operable by said eccentric disc of the microtome to periodically open said circuit to disconnect said high speed motor from the said driving shaft during the microtome cutting operations, said mechanical clutching means thereupon engaging said driving shaft with said low speed motor to drive the microtome at a relatively low speed during its said cutting operations.

2. The combination according to claim 1 including a second switch in said magnetic clutch circuit to permanently close the circuit for permanent operation of the microtome at the fast speed.

References Cited in the file of this patent

UNITED STATES PATENTS

| 2,281,569 | Fritsche | May 5, 1942 |
| 2,493,721 | La Brie | Jan. 3, 1950 |
| 2,573,011 | Gruber | Oct. 30, 1951 |
| 2,796,317 | Valenti et al. | June 18, 1957 |
| 2,843,014 | Sitte | July 15, 1958 |

FOREIGN PATENTS

| 172,605 | Austria | Mar. 15, 1952 |
| 539,376 | Italy | Feb. 10, 1956 |